(12) United States Patent  
Mallory, III

(10) Patent No.: US 9,475,433 B1
(45) Date of Patent: Oct. 25, 2016

(54) AUTOMATED, INTERCHANGEABLE VEHICLE GRILL

(71) Applicant: Joseph Mallory, III, Arlington, TX (US)

(72) Inventor: Joseph Mallory, III, Arlington, TX (US)

(*) Notice: Subject to any disclaimer, the term of this patent is extended or adjusted under 35 U.S.C. 154(b) by 0 days.

(21) Appl. No.: 14/740,385

(22) Filed: Jun. 16, 2015

Related U.S. Application Data

(60) Provisional application No. 62/021,774, filed on Jul. 8, 2014.

(51) Int. Cl.
*B60R 13/00* (2006.01)
*B62D 25/08* (2006.01)
*B60R 11/00* (2006.01)

(52) U.S. Cl.
CPC .............. *B60R 13/005* (2013.01); *B60R 11/00* (2013.01); *B62D 25/085* (2013.01); *B60R 2011/0085* (2013.01); *B60R 2011/0092* (2013.01)

(58) Field of Classification Search
CPC ........................... B60R 13/005; B62D 25/085
USPC ...... 180/68.6; 296/193.1, 1.08; 40/211, 473, 40/492, 591
See application file for complete search history.

(56) References Cited

U.S. PATENT DOCUMENTS

| | | | | |
|---|---|---|---|---|
| 2,635,227 A * | 4/1953 | Liotta | ................... | B60Q 1/503 340/488 |
| 4,534,506 A * | 8/1985 | Ishida | ...................... | F01P 7/12 123/41.05 |
| 4,638,580 A * | 1/1987 | Giannetti | .............. | G09F 11/025 40/473 |
| 5,375,354 A * | 12/1994 | Rutledge | ................. | G09F 21/04 40/591 |
| 5,822,900 A * | 10/1998 | Armstrong | .............. | G09F 21/04 40/473 |
| 7,153,092 B1 * | 12/2006 | Randolph | ................. | F03D 3/00 416/55 |
| 7,325,864 B1 * | 2/2008 | Echeverria | .............. | B60R 19/52 180/68.6 |
| 7,498,926 B2 * | 3/2009 | Browne | ............... | B60K 11/085 123/41.06 |
| 8,038,204 B1 * | 10/2011 | Baker | ...................... | B60R 13/00 296/1.08 |
| 8,161,919 B2 * | 4/2012 | Klotz | ................... | B60K 11/085 123/41.04 |
| 8,250,793 B1 * | 8/2012 | Halula | .................. | G09F 11/025 40/200 |
| 8,469,128 B2 * | 6/2013 | Van Buren | ........... | B60K 11/085 165/44 |
| 8,505,660 B2 * | 8/2013 | Fenchak | .............. | B60K 11/085 180/68.1 |
| 2005/0217911 A1 * | 10/2005 | Cheng | .................... | B60R 19/52 180/68.6 |
| 2014/0129078 A1 * | 5/2014 | Jeong | ...................... | G06F 11/30 701/32.8 |

* cited by examiner

*Primary Examiner* — Jason S Morrow

(74) *Attorney, Agent, or Firm* — Kenneth L. Tolar

(57) ABSTRACT

An automated, interchangeable vehicle grill includes a plurality of reversible motors, each mounted near an existing grill opening on the front end of a vehicle. Each motor rotates a drive shaft having a grill block mounted thereon. The grill block includes two adjacent sides, each having a unique, discrete grill configuration. For example, a first side is configured to resemble a standard, factory-installed grill, while a second side is configured to resemble a billet or other non-standard, aftermarket grill. Accordingly, a user can automatically switch between two different grill configurations by simply operating a switch within the passenger compartment.

5 Claims, 2 Drawing Sheets

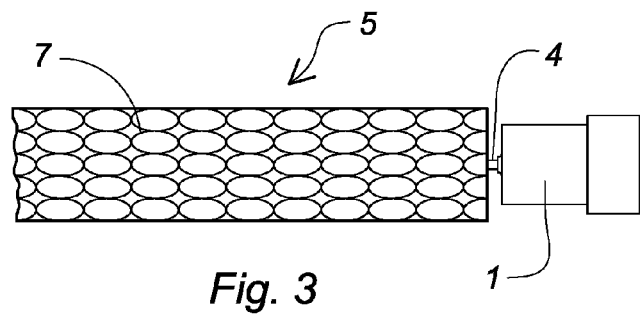
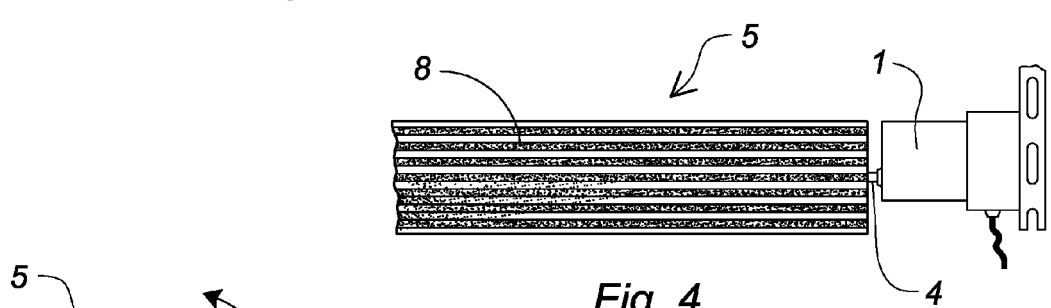
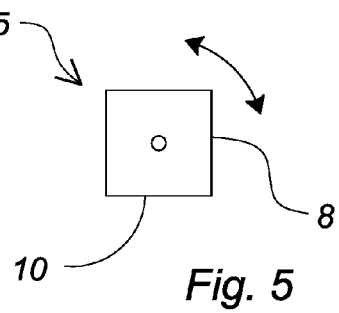
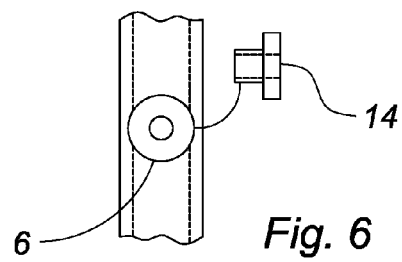
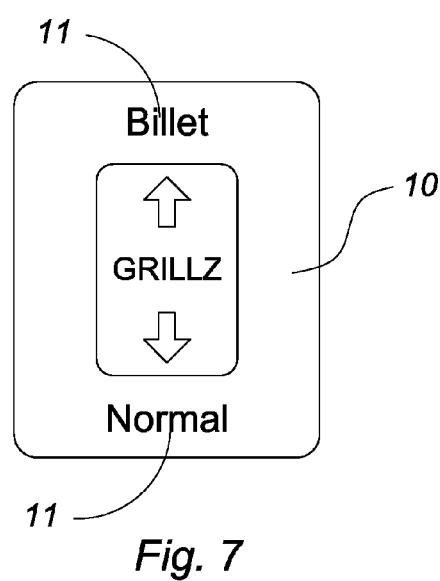
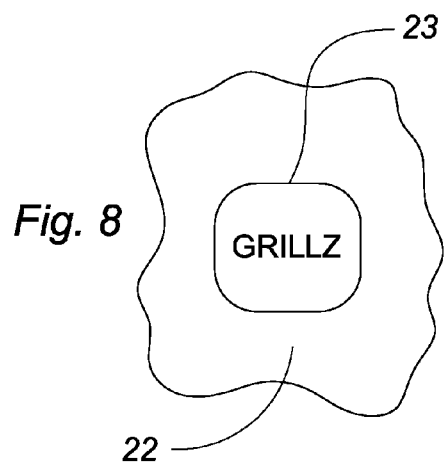

AUTOMATED, INTERCHANGEABLE VEHICLE GRILL

CROSS REFERENCE TO RELATED APPLICATIONS

This application is entitled to the benefit of provisional patent application No. 62/021,774 filed on Jul. 8, 2014, the specification of which is incorporated herein by reference.

BACKGROUND OF THE INVENTION

The present invention relates to a device that automatically changes the configuration of a vehicle grill.

DESCRIPTION OF THE PRIOR ART

All vehicles are equipped with a grill on the front end that allows ambient air to flow to the engine. If a vehicle owner wishes to change the existing grill design, he or she must manually remove the grill and install an aftermarket grill. Removing or installing a grill is laborious, tedious and time consuming. Furthermore, many aftermarket grills, even if specifically designed for a particular type of vehicle, do not always fit properly.

Accordingly, there is currently a need for a vehicle grill that can be quickly and easily replaced. The present invention addresses this need by providing a device that automatically rotates one of two differently configured grills into a grill opening to selectively vary the appearance thereof.

SUMMARY OF THE INVENTION

The present invention relates to an automated, interchangeable vehicle grill comprising a plurality of reversible motors, each mounted near an existing grill opening on the front end of a vehicle. Each motor rotates a drive shaft having a rectangular grill block mounted thereon. The rectangular grill block includes two adjacent sides, each having a unique, discrete grill configuration. For example, a first side is configured to resemble a standard, factory-installed grill, while a second side is configured to resemble a billet or other non-standard, aftermarket grill. Accordingly, a user can automatically switch between two different grill configurations by simply operating a switch within the passenger compartment.

It is therefore an object of the present invention to provide a device that allows a user to quickly and easily modify the appearance of a vehicle grill.

It is another object of the present invention to provide a device that allows a user to automatically change a vehicle grill by operating a switch within the vehicle passenger compartment.

Other objects, features, and advantages of the present invention will become readily apparent from the following detailed description of the preferred embodiment when considered with the attached drawings and the appended claims.

BRIEF DESCRIPTION OF THE DRAWINGS

FIG. 3 is an isolated, plan view of an exemplary motor and block.

FIG. 4 is an isolated, plan view of the motor and block of FIG. 3 with the block rotated ninety degrees to expose the other grill configuration.

FIG. 5 is an end view of the block.

FIG. 6 is an isolated view of the channel and bushing.

FIG. 7 is an isolated view of the control switch.

FIG. 8 is an isolated view of the portable electronic device.

DESCRIPTION OF THE PREFERRED EMBODIMENT

Figure 1:
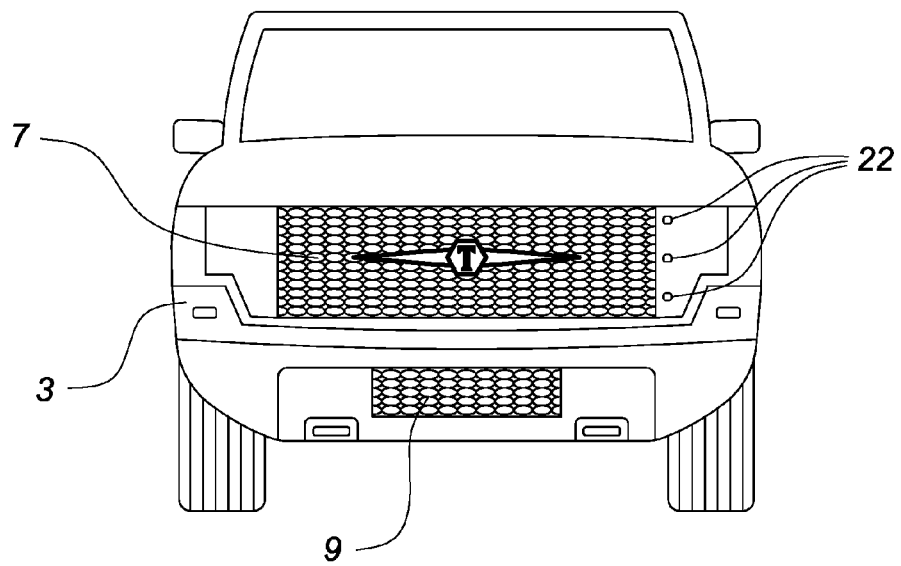
FIG. 1 depicts the interchangeable grill according to the present invention installed on a vehicle, with the first grill configuration rotated into the grill opening.
Figure 2:
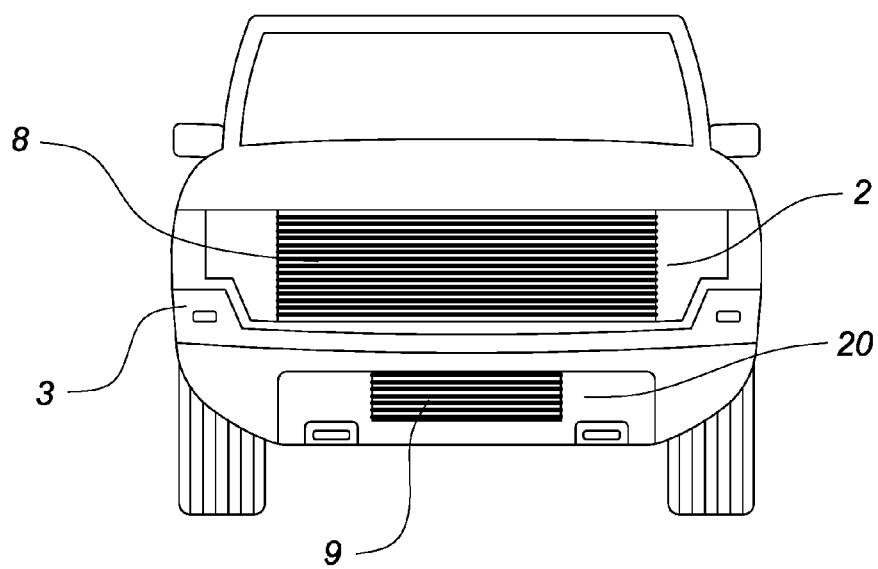
FIG. 2 is a front view of the vehicle of FIG. 1 with the second grill configuration rotated into the grill opening.

The present invention relates to an automated, interchangeable vehicle grill for replacing the existing stationary grill within an opening 2 on the front end 3 of a vehicle. The interchangeable grill according to the present invention comprises a plurality of reversible motors 1 mounted on the vehicle chassis, proximal a first side of the opening 2. Each motor reversibly rotates a drive shaft 4 having a grill block 5 mounted thereon. At distal end of each grill block is a bushing 14 rotatably received within a channel 6 on the vehicle chassis, at a side of the grill opening that is opposite the motors. The grill block has a rectangular cross-section with four sides, wherein two adjacent sides each have a unique, discrete grill configuration. For example, a first side 7 is configured to resemble a standard, factory-installed grill, while a second adjacent side 8 is configured to resemble a billet or other non-standard, aftermarket grill. The other two sides are substantially open or porous to allow airflow through the block regardless of orientation. Multiple, motorized, tiered blocks combine to form a unitary grill that fills the entire height of the grill opening 2. However, the tiered blocks are sufficiently spaced so as not to bind or collide with the others when rotating. A single, additional motorized block 30 may be positioned within a lower opening 20 on vehicles also having a lower grill.

Each motor is in communication with a microcontroller and a switch 10 that is conveniently mounted within the vehicle passenger compartment. The switch is movable between two positions 11A, 11B to allow a driver to select which of the two grill configurations is displayed within the grill opening. When a user moves the switch, the motors rotate the blocks ninety degrees in either of two directions. Angle sensors 22 determine when the block has rotated ninety degrees and signal the microcontroller to disable the motors so that the selected grill configuration is properly oriented within the grill opening. The motor gears fix the blocks in the selected position once the motors are disabled.

The motors may also be remotely controlled with a smart phone or a similar portable electronic device 22 using and application 23 and wireless communication technology, such as that commonly marketed and sold under the trademark Bluetooth™. Accordingly, a user can automatically switch between two different grill configurations by simply operating a switch within the passenger compartment, or by using an application on a portable electronic device.

The above-described device is not limited to the exact details of construction and enumeration of parts provided herein. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. In combination with a vehicle having a grill opening at a front end, an interchangeable grill comprising:
    at least one block received with said grill opening, said block having two adjacent sides, a first of said sides having a first vehicle grille configuration, and a second of said sides having a second discrete vehicle grille configuration that differs from said first vehicle grille configuration, said block being air permeable regardless of an orientation of said block;
    means for rotating said block in either of two directions to display either of said adjacent sides within said grill opening to selectively modify a configuration and appearance of a vehicle grill.

2. The combination according to claim 1 wherein said means for rotating said block in either of two directions comprises a reversible motor attached to said block.

3. The combination according to claim 2 further comprising a switch in combination with a microcontroller for instructing said motor to operate in either of two directions.

4. The combination according to claim 3 further comprising angle sensors in communication with said microcontroller that instruct said microcontroller to disable said motors when one of said adjacent sides is positioned within said grill opening to prevent said block from rotating out of alignment with said grill opening.

5. The combination according to claim 3 wherein said means for rotating said block in either of two directions further comprises a portable electronic device in communication with said microcontroller and said motor, said portable electronic device having an application for instructing said microcontroller to rotate the motor in either of the said two directions.

* * * * *